11β-HYDROXY-11α-LOWER-ALKYLPREGNANE-3,20-DIONES

Gunther S. Fonken, Kalamazoo, Mich., assignor to The Upjohn Company, Kalamazoo, Mich., a corporation of Michigan No Drawing. Filed May 23, 1957, Ser. No. 661,036
2 Claims. (Cl. 260—397.45)

This invention relates to organic compounds of the pregnane series and is more particularly concerned with novel 3,20-dioxygenated-11β-hydroxy-11α-alkylpregnanes which may be illustrated by the formula:

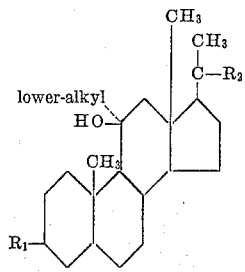

wherein $R^1$ is a α-hydroxy, β-hydroxy or keto, and $R^2$ is hydroxy or keto. The lower-alkyl radical contains from one to eight carbon atoms, inclusive, e.g., methyl, ethyl, propyl, butyl, pentyl, hexyl, isohexyl, heptyl, octyl, isoheptyl, etc., preferably methyl, and the pregnane nucleus is a 5α or 5β-pregnane, i.e., allo or normal pregnane.

It is an object of this invention to provide the novel 3,20 - dioxygenated - 11β - hydroxy - 11α - lower - alkylpregnanes, which are useful in the treatment of hypertension, nervous disorders and related illnesses since they possess central nervous system depressant activity and potentiate the activity of barbiturate drugs. The compounds also are useful in the production of other physiologically active 11-alkyl steroids (e.g., 11-methylhydrocortisone, described and claimed in copending application Serial No. 510,516, filed May 23, 1955, now U.S. Patent No. 2,880,204) by the method described in copending application Serial No. 661,037, filed May 23, 1957.

The compounds of the present invention are produced in accordance with the following:

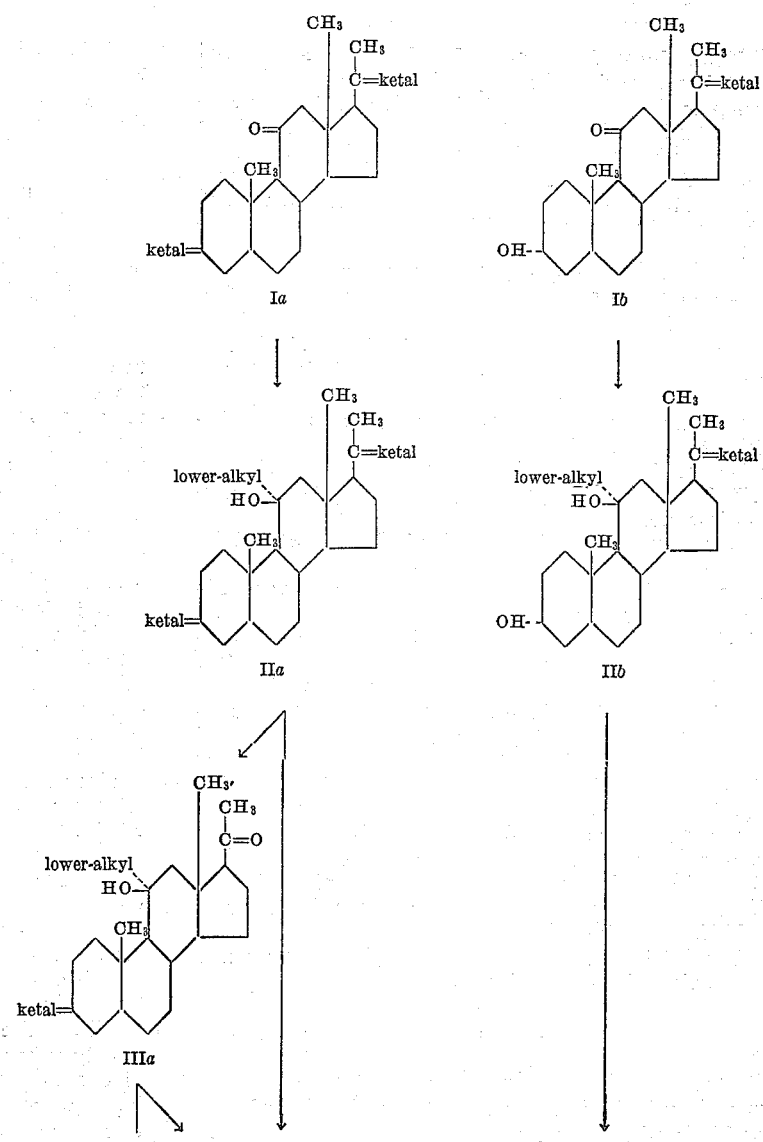

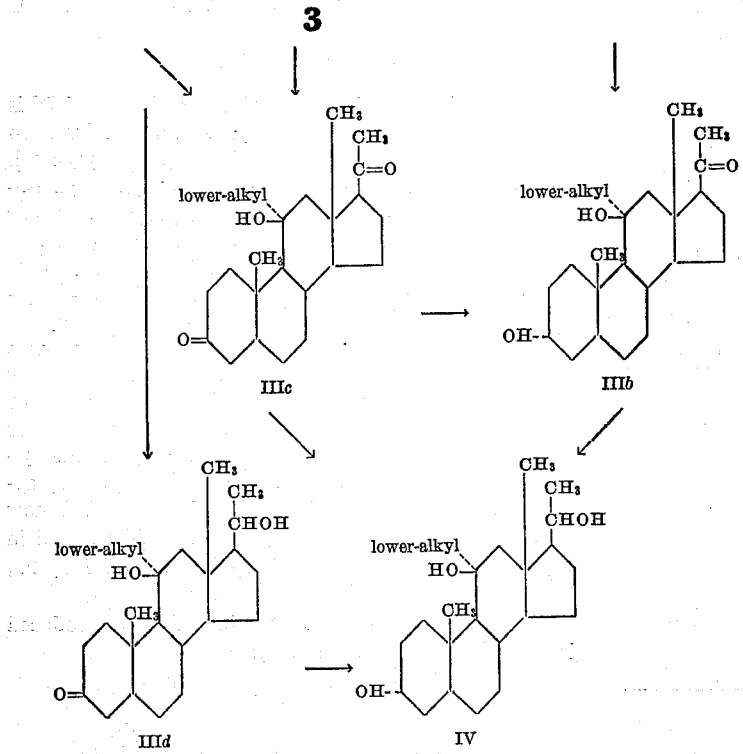

Thus, 5α(or 5β)-pregnane-3,11,20-trione 3,20-diketal (Ia) is alkylated at the 11 position with an alkyl metal compound to produce 11β-hydroxy-11α-alkyl-5α(or 5β)-pregnane-3,20-dione 3,20-diketal (IIa), which is then hydrolyzed to produce the novel 11β-hydroxy-11α-alkyl-5α(or 5β)-pregnane-3,20-dione (IIIc). The thus produced 11α-alkyl compounds (IIIc) are then reduced at the 3 and 20 positions to yield the novel 3α(or 3β),11β,20-trihydroxy-11α-alkyl-5β(or 5α)-pregnane (IV).

Alternatively, the novel 3α(or 3β),11β,20-trihydroxy-11α-alkyl-5β(or 5α)-pregnanes (IV) can be produced by first partially hydrolyzing 11β-hydroxy-11α-alkyl-5α(or 5β)-pregnane-3,20-dione 3,20-diketal (IIa) to obtain 11β-hydroxy-11α-alkyl-5α(or 5β)-pregnane-3,20-dione 3-ketal (IIIa) and thereafter reducing the 20-keto group and hydrolyzing the 3-ketal group to give the novel 11β,20-dihydroxy-11α-alkyl-5α(or 5β)-pregnane-3-one (IIId), which on further reduction yields the 3α(or 3β),11β,20-trihydroxy-11α-alkyl-5β(or 5α)-pregnane (IV) of the present invention.

The novel 3α(or 3β),11β,20-trihydroxy-11α-alkyl-5β-(or 5α)-pregnane (IV) additionally can be obtained from 3α(or 3β)-hydroxy-5β(or 5α)-pregnane-11,20-dione 20-ketal (Ib) by alkylating the said mono ketal with an alkyl metal compound to give 3α(or 3β),11β-dihydroxy-11α-alkyl-5β(or 5α)-pregnane-20-one 20-ketal (IIb). The latter compound is then hydrolyzed to produce the novel 3α(or 3β),11β-dihydroxy-11α-alkyl-5β(or 5α)-pregnane-20-one (IIIb), which is then reduced to yield the novel 3α(or 3β),11β,20-trihydroxy-11α-alkyl-5β(or 5α)-pregnane (IV) of the present invention. Whether the 3α or the 3β-hydroxy product (IV) is obtained depends on the configuration of the 5-hydrogen of the steroid to be reduced. Thus, reduction of 11β,20-dihydroxy-11α-alkyl-5β-pregnane-3-one (IIId) gives the 3α-hydroxy product, whereas reduction of the 5α isomer of IIId yields the 3β-hydroxy steroid.

The ketal radicals of the aforementioned compounds are cyclic radicals of the formula

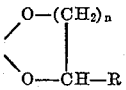

wherein $n$ is the integer one or two and R is hydrogen or lower alkyl containing one to six carbon atoms, inclusive, e.g., methyl, ethyl, propyl, isopropyl, butyl, 1-methylpropyl, amyl, hexyl, etc., the 1,2-alkylene ketals being preferred.

The starting 5α steroids (Ia) can be prepared from the known 5α-pregnane-3,11,20-trione by ketalizing at the 3 and 20 positions as described in preparation 1 herein.

The ketalization of 5β-pregnane-3,11,20-trione to prepare the IIa compounds or the ketalization of 3α-hydroxypregnane-11,20-dione to prepare the IIb compounds can be carried out in known manner as is disclosed, for example, in U.S. Patents No. 2,773,059 and No. 2,773,060. For example, in the 3,20-diketalization and the 20-monoketalization, the steroid compounds are mixed with about two and one-half to 25 times the theoretical quantity of the desired alkanediol, preferably an alkane 1,2-diol or an alkane-1,3-diol corresponding to the above-described cyclic ketal radical. An organic nonreactive solvent is used, and the reaction temperature is maintained between about twenty and about 200 degrees centigrade. The time required for the reaction is not critical and can be varied between about one and about 24 hours, the length of time being somewhat dependent on the temperature, the ketalizing agent and the catalyst employed.

As disclosed in the patents previously referred to, acid ketalizing catalysts such as a mineral acid or an organic sulfonic acid are used, e.g., ortho- and paratoluenesulfonic acids, naphthalenesulfonic acid, benzenesulfonic acid, ortho-chlorobenzenesulfonic acid, hydrochloric acid, and sulfuric acid. The ketalizing reaction can be conducted in any organic solvent with which the reactants and products are nonreactive, such as, for example, benzene, toluene, xylene, methylene chloride, petroleum ether, diethyl ether, and the like; the water-azeotrope forming solvents are preferred.

Selective hydrolysis of the 3,20-diketal (IIa) to produce the 3-monoketal (IIIa) is carried out in a solvent medium using a dilute concentration of a strong acid, preferably in excess of that theoretically required to accomplish mono-hydrolysis. The solvent is preferably water-miscible such as acetone, methanol, ethanol, and the like. The acid can be one of those mentioned previously as ketalizing catalysts. Under these reaction conditions, the 20-ketal group is hydrolyzed, and the resulting 3-monoketal can be separated from the reaction mixture by conventional procedures.

Compounds IIIb and IIIc, above, can be reketalized in accordance with the process described in the foregoing paragraphs to produce IIb and IIa, respectively.

It is to be understood that esters of the aforementioned compounds of the present invention also are included within the scope thereof, the esters being useful for the same purposes as the parent hydroxy compounds. Examples of these esters are: 11β-hydroxy-11α-alkyl-5α(or 5β)-pregnane-3,20-dione 11β-monoesters; 3α(or 3β),11β,20-trihydroxy-11α-alkyl-5β(or 5α)-pregnane 11β and 20-monoesters; 3α(or 3β),11β-, 3α(or 3β),20-, and 11β,20-diesters, and 3,11β,20-triesters; 3α(or 3β),11β-dihydroxy-11α-alkyl-5β(or 5α)-pregnane-20-one 3- and 11β-monoesters and 3,11β-diesters; and 11β,20α(or 20β)-dihydroxy-11α-alkyl-5α(or 5β)-pregnane-3-one 11β- and 20-monoesters and 11β,20-diesters. Preferably the ester radical is a hydrocarbonyloxy

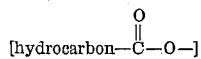

radical containing less than twelve carbon atoms. A preferred embodiment of the said radical is acetoxy. Of particular interest are the esters of the 3- and/or 20-hydroxy steroids of this invention which convey water solubility through salt formation of the physiologically compatible cations or anions. Examples of such ester radicals are the hemisuccinate, the hemi-(β,β-dimethylglutarate), and the glycine radical.

Illustrative ester radicals are those containing acyl radicals of the acids formic, propionic, butyric, isobutyric, valeric, isovaleric, trimethylacetic, 2-methylbutyric, 3-ethylbutyric, hexanoic, diethylacetic, triethylacetic, heptanoic, octanoic, optically active abietic, α-ethylisovaleric, cyclopropylideneacetic, cyclopentylformic, cyclopentylacetic, α- and β-cyclopentylpropionic, cyclohexylformic, cyclohexylacetic, α- and β-cyclohexylpropionic, benzoic, 2, 3 or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, phenylacetic, α- and β-phenylpropionic, diphenylacetic, triphenylacetic, succinic, glutaric, α-methylglutaric, β-methylglutaric, β,β-dimethylglutaric, adipic, pimelic, suberic, glycolic, lactic, citric, tartaric, d-malic, d-glyceric, malonic, gluconic, salicylic, glycine, diglycollamic, triglycollamic, methylglycine, dimethylglycine, diethylglycine, para-aminosalicylic, para-aminobenzoic, ethylmercaptoacetic, benzylmercaptoacetic, cyanoacetic, chloroacetic, fluoroacetic, trichloroacetic, trifluoroacetic, thioglycolic, 3,4,5-trimethoxybenzoic, α-naphthoxyacetic, β-pyrrolidylpropionic, carbamic acid, phenylcarbamic, n-butylcarbamic, dimethylcarbamic, diethylcarbamic, allophanic, α- and β-furylcarboxylic, N-methylpyrrolidyl-2-carboxylic, α-picolinic, indole-2-carboxylic, 5-hydroxyindolyl-3-acetic, N-methylmorpholyl-2-carboxylic, pyrrolyl-2-carboxylic, etc.

The esterification reactions are carried out in known manner; for example, the 3,11-dihydroxy compounds IIIb and the 3,11,20-trihydroxy compounds IV can be esterified by reaction with an excess of the selected acid anhydride or acid chloride or bromide, preferably in the presence of pyridine or like tertiary aromatic amine, or by reaction with the selected acid in the presence of an esterification catalyst or with an ester under ester exchange conditions. Partial esters can be prepared by known methods, e.g., by partial hydrolysis of the completely esterified compound, or, alternatively, by partial esterification of a polyhydroxy compound such as IIIb or IV.

The alkylation step in the present process, i.e., conversion of a starting 11-keto compound to an 11α-alkyl-11β-hydroxy compound, e.g., the conversion of 5α(or 5β)-pregnane-3,11,20-trione 3,20-diketal (Ia) to 11β-hydroxy-11α-alkyl-5α(or 5β)-pregnane-3,20-dione 3,20-diketal (IIa) and 3α(or 3β)-hydroxy-5β(or 5α)-pregnane-11,20-dione 20-ketal (Ib) to 3α(or 3β),11β-dihydroxy-11α-alkyl-5β(or 5α)-pregnane-20-one 20-ketal (IIb), is accomplished by reacting the starting 11-keto compound with a lower-alkyllithium, e.g., methyl-, ethyl-, propyl-, butyl-, isobutyl-, amyl-, hexyl-, heptyl-, octyl-, etc. lithium, with methyllithium being preferred. The usual prior art reaction conditions for alkylation of a carbonyl group with an alkyllithium can be employed. Normally the present alkylation is carried out at about room temperature, i.e., between about fifteen and about 35 degrees centigrade, without heating or cooling. However, somewhat lower and higher temperatures may be employed if desired. The intermediate 11α-alkyl-11β-hydroxy lithium complex compound is decomposed with water, acid, methanol, ethanol, etc., according to known methods, to produce the desired 11α-alkyl-11β-hydroxy-steroid, e.g., 11β-hydroxy-11α-alkyl-5α(or 5B)-pregnane-3,20-dione 3,20-diketal (IIa) and 3α(or 3β),11β-dihydroxy-11α-alkyl-5β(or 5α)pregnane-20-one 20-ketal (IIb). The epimeric 11β-alkyl-11α-hydroxy isomers also are produced in small amounts in the alkylation reaction, these epimers possessing steroid hormone activity similar to cortisone and hydrocortisone.

The hydrolysis steps in the present process involve cleavage of a 20-ketosteroid 20-ketal to regenerate the 20-ketosteroid, e.g., conversion of 11β-hydroxy-11α-alkyl 5α(or 5β)-pregnane-3,20-dione 3,20-diketal (IIa) to 11β - hydroxy - 11α - alkyl - 5α(or 5β) - pregnane-3,20 - dione (IIIc) and 3α(or 3β),11β - dihydroxy - 11α-alkyl - 5β(or 5α - pregnane - 20 - one 20-ketal (IIb) to 3α(or 3β),11β - dihydroxy - 11α - alkyl - 5β(or 5α)-pregnane-20-one (IIIb). The ketal compound is dissolved in an organic solvent, and this solution is admixed with at least a theoretical amount, and preferably an excess, of water as the hydrolyzing agent. The organic solvent is preferably of the water-miscible type, such as, for example, acetone, methanol, ethanol, dioxane, and the like. Ordinarily, it is preferred to use a temperature between about twenty and about forty degrees centigrade in carrying out the reaction, but temperatures as low as zero and as high as 100 degrees centigrade or even higher are operative. The time required for the reaction can be varied between about one and about 24 hours, depending on the temperature and the hydrolyzing agent employed. The amount of acid may be varied over a wide range. Amounts from a trace to a large excess are operative. The agent is a strong acid such as, for example, sulfuric acid, hydrochloric acid, ortho- or para-toluenesulfonic acid, naphthalene sulfonic acid, benzenesulfonic acid, orthochlorobenzenesulfonic acid, trichloroacetic acid, or the like, with sulfuric acid and hydrochloric acid being preferred. The acid hydrolyzing agent is generally employed as a dilute aqueous solution. Acid concentrations in the reaction mixture of about 0.1 percent to about twenty percent are preferably employed, but lower and higher concentrations are operative.

When selective hydrolysis of the 20-ketal radical of a 3,20-diketal is desired, e.g., conversion of 11β-hydroxy-11α-alkyl-5α(or 5β-pregnane-3,20-dione 3,20-diketal (IIa) to 11β-hydroxy-11α-alkyl-5α(or 5β)-pregnane-3,20-dione 3-ketal (IIIa), the lower reaction temperatures, lower acid concentrations, and a shorter reaction period are employed to limit the hydrolysis reaction and obtain a satisfactory yield of 3-mono-ketal. Hydrolysis of a 3-monoketal radical, e.g., conversion of 11β-hydroxy-11α-alkyl-5α(or 5β)-pregnane-3,20-dione 3-ketal (IIIa) to 11β-hydroxy-11α-alkyl-5α(or 5β)-pregnane-3,20-dione (IIIc), is accomplished by the more vigorous conditions outlined above.

The reduction step of the present invention involves conversion of a 20-ketosteroid to a 20-hydroxy-steroid, e.g., conversion of 3α(or 3β),11β-dihydroxy-11α-alkyl-5β(or 5α)-pregnane-20-one (IIIb), 11β-hydroxy-11α-alkyl - 5α(or 5β - pregnane - 3,20 - dione (IIIc) and 11β,20 - dihydroxy - 11α - alkyl - 5α(or 5β) - pregnane- 3-one (IIId) to 3α(or 3β),11β,20 - trihydroxy - 11α-alkyl-5β(or 5α)-pregnane (IV), and is accomplished by mixing a reducing agent with the ketosteroid in the presence of a nonreacting organic solvent. Reducing agents such as, for example, lithium aluminum hydride, lithium borohydride, sodium borohydride, hydrogen in the presence of catalysts such as palladium and others are operative, with sodium borohydride being preferred. Solvents such as, for example, ether, benzene, tetrahydrofuran, petroleum ether, and others are satisfactory.

In the preferred embodiment of this step of the process, sodium borohydride is admixed with methanol and allowed to contact the steroid for a period of several hours, preferably with constant mixing. Reduction will proceed over a wide range of temperatures, this range being limited only by the boiling point of the solvent and freezing point of the reaction mixture. At room temperature a contact period of eight to sixteen hours may be required, depending on the ratio of reducing agent to steroid and the number of carbonyl groups to be reduced. A liberal excess of sodium borohydride over that theoretically required should be used where the possibility exists of a selective reduction of 3-carbonyl group.

The desired trihydroxysteroid is separated from the reaction mixture by conventional procedure. Thus, when employing reducing agents such as lithium aluminum hydride or sodium borohydride, the reaction mixture is hydrolyzed with water upon completion of the reduction, followed by extraction and recrystallization from an organic solvent. When selective reduction of the 3-keto group in a 3,20-diketosteroid is desired, e.g., conversion of 11β-hydroxy-11α-alkyl-5α(or 5β)-pregnane-3,20-dione (IIIc) to 3α(or 3β),11β-dihydroxy-11α-alkyl-5β(or 5α)-pregnane-20-one (IIIb), sodium borohydride is employed as the reducing agent under carefully controlled conditions.

As previously indicated, the isomeric form of the 3-hydroxy group produced on reduction of the 3-keto group is determined by the configuration of the nuclear hydrogen at the 5 position of the starting steroid. Thus, a 3-keto-5β-pregnane compound is reduced to the 3α-hydroxy steroid, while the 3-keto-5α-pregnane gives the 3β-hydroxy compound.

The preparations and examples which follow are illustrative of the process yielding the products of the present invention and are not to be construed as limiting the scope thereof.

PREPARATION 1

5α-pregnane-3,11,20-trione 3,20-bis(ethylene acetal) (Ia)

A mixture of 22 grams of 5α-pregnane-3,11,20-trione, 100 milliliters of ethylene glycol, five grams of paratoluenesulfonic acid monohydrate and 500 milliliters of toluene was stirred and refluxed through a water trap for about 24 hours. The mixture was cooled, treated with a solution of five grams of potassium hydroxide in fifty milliliters of methanol added with stirring, and washed with four one-liter portions of water. Filtration through anhydrous sodium sulfate and then through a synthetic magnesium silicate column (five centimeter diameter x fifteen centimeter height), washing the column with three liters of benzene, gave a colorless solution which was evaporated to dryness. The residue was recrystallized from about two liters of Skellysolve B hexanes to give 14.99 grams of 5α-pregnane-3,11,20-trione 3,20-bis(ethylene acetal), melting point 207 to 210 degrees centigrade, [α]$_D$ plus 48 degrees (acetone).

In the same manner but substituting for the ethylene glycol above compounds having cyclic ketal radicals of the formula

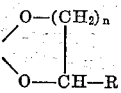

wherein n is the integer one or two and R is hydrogen or lower alkyl containing one to six carbon atoms, inclusive, e.g., methyl, ethyl, propyl, isopropyl, butyl, 1-methylpropyl, amyl, hexyl, etc., is productive of the corresponding 3,20-diketals.

PREPARATION 2

11β-hydroxy-11α-methyl-5α-pregnane-3,20-dione bis(ethylene acetal) (IIa)

A solution of ten grams of 5α-pregnane-3,11,20-trione 3,20-bis(ethylene acetal) (Ia) in 150 milliliters of benzene and 100 milliliters of ether was treated with 100 milliliters of molar ethereal methyllithium at room temperature overnight. The excess methyllithium was decomposed by the cautious addition of water, and the organic phase was separated and washed twice with water. Filtration through anhydrous sodium sulfate followed by evaporation of the filtrate at reduced pressure followed by crystallization of the residue from about 100 milliliters of Skellysolve B hexanes gave 8.5 grams of 11β-hydroxy-11α-methyl-5α-pregnane-3,20-dione bis(ethylene acetal), melting point 131 to 133 degrees centigrade. Recrystallization from Skellysolve B hexanes gave a pure sample, melting point 135 to 136 degrees centigrade. The infrared spectrum showed hydroxyl and ketal absorption bands, with only a trace of carbonyl absorption.

If for the methyllithium employed above there is substituted another lower-alkyllithium, e.g., ethyl-, propyl-, butyl-, isobutyl-, amyl-, hexyl-, heptyl-, octyl-, etc., the corresponding 11-alkylated steroids are produced.

Similarly, substitution of other 3,20-diketals as indicated in Preparation 1 is productive of the corresponding 11-alkylated 3,20-diketals.

PREPARATION 3

11β-hydroxy-11α-methyl-5β-pregnane-3,20-dione 3,20-bis(ethylene acetal) (IIa)

A solution of 12.7 grams (thirty millimoles) of 5β-pregnane-3,11,20-trione 3,20-bis(ethylene acetal) (Ia) in 150 milliliters of benzene (dried over calcium hydride) was diluted with 150 milliliters of anhydrous ether and treated with 100 milliliters (67 millimoles) of 0.67 M methyllithium (ethereal). Appreciable heat was evolved, but no precipitate was formed.

The mixture was allowed to stand for forty hours at room temperature (although there is evidence that the reaction is practically instantaneous) and was then cautiously treated with water to destroy the excess methyllithium. The organic phase was washed several times with water (the last wash having pH about 5), filtered through anhydrous sodium sulfate, and evaporated to dryness, giving the desired 11β-hydroxy-11α-methyl-5β-pregnane-3,20-dione 3,20-bis(ethylene acetal) (IIa) as a white foam.

PREPARATION 4

11β-hydroxy-11α-butyl-5β-pregnane-3,20-dione bis(ethylene acetal) (IIa)

Butyllithium was prepared from 2.6 grams of lithium wire in sixty milliliters of ether to which, at minus ten degrees centigrade, 20.6 grams of butyl bromide in thirty milliliters of ether was added. To 100 milliliters of this solution was added a solution of 4.18 grams of 5β-pregnane-3,11,20-trione 3,30-bis(ethylene acetal) in 25 milliliters of benzene and fifty milliliters of ether. The mixture, after standing at room temperature overnight, was cautiously treated with water, washed several times with water, filtered through sodium sulfate, and evaporated to give a pale-yellow glass. This was dissolved in 25 milliliters of anisole and 200 milliliters of Skellysolve B (hexane hydrocarbons) and chromatographed over a five by twenty centimeter Florisil magnesium silicate column, taking 1-liter eluate fractions.

| Fraction | Solvent | Residue Weight (gram) | Appearance |
|---|---|---|---|
| 1 | Anisole, Skellysolve B | 0 | |
| 2 | Skellysolve B | 0 | |
| 3 | 10% ether-Skellysolve B | 0.291 | Cryst., M.P. 123–131°. |
| 4 | 50% ether-Skellysolve B | (Not weighed—rechromatographed). | Oil. |
| 5 | 2% acetone-Skellysolve B | 0.213 | Oil. |
| 6 | 25% acetone-Skellysolve B | 0.941 | Oil. |
| 7 | Acetone | 0.016 | |

Rechromatography of fraction 4 over a fresh column, taking 330-milliliter fractions, afforded more crystalline product.

| Fraction | Solvent | Residue Weight (gram) | Appearance |
|---|---|---|---|
| 1–4 | Skellysolve B | 0 | |
| 5–10 | 5% ether-Skellysolve B | 0 | |
| 11 | 10% ether-Skellysolve B | 0 | |
| 12 | do | 0.114 | Cryst. |
| 13 | do | .183 | Cryst. |
| 14 | do | .166 | Oil. |
| 15 | do | .178 | Do. |
| 16 | do | .164 | Do. |
| 17 | 50% ether-Skellysolve B | .178 | Do. |
| 18 | do | 1.631 | Do. |
| 19 | do | .539 | Do. |
| 20 | do | .137 | Do. |
| 21 | do | .043 | Do. |
| 22 | do | .020 | Do. |

Fractions 12 and 13 were combined with the material from fraction 3 of the earlier chromatogram to give 0.58 gram of crude 11β-hydroxy-11α-butyl-5β-pregnane-3,20-dione bis(ethylene acetal) (IIa).

PREPARATION 5

*11β-hydroxy-11α-methyl-5β-pregnane-3,20-dione 3-ethylene acetal (IIIa)*

A solution of two grams of 11β-hydroxy-11α-methyl-5β-pregnane-3,20-dione 3,20-bis(ethylene acetal) (IIa) is dissolved in twenty milliliters of acetic acid containing two milliliters of water and maintained at five to eight degrees centigrade for eighteen hours. At the end of this period, dilution with water and neutralization of the acetic acid with sodium bicarbonate gives crude 11β-hydroxy-11α-methyl-β-pregnane-3,20-dione 3-ethylene acetal (IIIa), which is recrystallized from acetone-Skellysolve B hexanes to give a substantially pure product. (See also Example 1.)

In exactly the same manner, but substituting the 5α isomer of 11β-hydroxy-11α-methyl-5β-pregnane-3,20-dione 3,20-bis(ethylene acetal) (IIa) as the starting material, there is produced the corresponding 11β-hydroxy-11α-methyl-5α-pregnane-3,20-dione 3-ethylene acetal (IIIa).

PREPARATION 6

*3α,11β-dihydroxy-11α-methyl-5β-pregnane-20-one ethylene acetal (IIb)*

A solution of 13.6 grams of 3α-hydroxy-5β-pregnane-11,20-dione 20-ethylene acetal (Ib) in 150 milliliters of benzene and 100 milliliters of ether was treated with 144 milliliters of molar ethereal methyllithium at room temperature overnight. The organic solution was washed twice with water, filtered through sodium sulfate, and evaporated to dryness at reduced pressure. Chromatographic separation yielded 3α,11β-dihydroxy-11α-methyl-5β-pregnane-20-one ethylene acetal (IIb) melting at 234 to 236 degrees centigrade.

*Analysis.*—Calculated for $C_{24}H_{40}O_4$: C, 73.42; H, 10.27. Found: C, 74.91; H, 10.11.

EXAMPLE 1

*11β-hydroxy-11α-methyl-5β-pregnane-3,20-dione (IIIc)*

The 11β-hydroxy-11α-methyl-5β-pregnane-3,20-dione 3-20-bis(ethylene acetal) (IIa) from Preparation 3 above was dissolved in 200 milliliters of hot methanol and ten milliliters of 3 N sulfuric acid added. After about twenty hours at room temperature the slow addition of 190 milliliters of water was begun, thereby initiating crystallization of the product. The slurry was then cooled to about minus eighteen degrees centigrade and maintained at that temperature overnight, filtered, and the cake washed repeatedly with water and dried in vacuo at sixty degrees centigrade. The yield of crude material was 9.46 grams, melting point 135 to 155 degrees centigrade. Recrystallization from a minimum amount of acetone in Skellysolve B (hexane hydrocarbons) gave 6.75 grams (65 percent of theoretical) of good quality 11β-hydroxy-11α-methyl-5β-pregnane-3,20-dione (IIIc), melting point 162 to 165.5 degrees centigrade.

A sample was prepared for analysis by repeated recrystallization from acetone-Skellysolve B and was found to melt at 171 to 173 degrees centigrade, $[\alpha]_D$ plus 106 degrees (acetone).

*Analysis.*—Calculated for $C_{22}H_{34}O_3$: C, 76.26; H, 9.89. Found: C, 76.58; H, 9.98.

From another experiment on the same scale, the total crude product after acid hydrolysis was recovered by methylene chloride extraction and subjected to chromatography over 350 grams of synthetic magnesium silicate. The adsorbent was packed in Skellysolve B hexanes and the steroidal materials put on the column in 350 milliliters of methylene chloride. Elution was with 350-milliliter portions of solvents except as otherwise indicated in the following tabulation:

| Fraction No. | Solvent | Weight of Eluted Material (milligrams) |
|---|---|---|
| 1 | Methylene Chloride (1,200 ml.) | trace. |
| 2 | 2% Acetone-Skellysolve B (1,200 ml.). | Do. |
| 3 | 2% Acetone-Skellysolve B | Do. |
| 4 | do | 10. |
| 5 | do | 6. |
| 6 | do | 2. |
| 7 | do | 3. |
| 8 | do | 1. |
| 9 | 5% Acetone-Skellysolve B | 14. |
| 10 | do | 6. |
| 11 | do | 25. |
| 12 | do | 145. |
| 13 | do | 290. |
| 14 | do | 339. |
| 15 | do | 344. |
| 16 | do | 324. |
| 17 | do | 270. |
| 18 | do | 248. |
| 19 | do | 199. |
| 20 | do | 173. |
| 21 | 10% Acetone-Skellysolve B | 141. |
| 22 | do | 104. |
| 23 | do | 264. |
| 24 | do | 521. |
| 25 | do | 711. |
| 26 | do | 791. |
| 27 | 25% Acetone-Skellysolve B | 741. |
| 28 | do | 669. |
| 29 | do | 970. |
| 30 | do | 1,320. |
| 31 | do | 723. |
| 32 | do | 278. |
| 33 | Acetone (1,200 ml.) | Brown oil, small amount. |

Fractions 22 to 32 inclusive were combined and crystallized from acetone-Skellysolve B to give 3.09 grams of 11β-hydroxy-11α-methyl-5β-pregnane-3,20-dione (IIIc), melting point 164–167 degrees centigrade.

Fractions 11 to 21 inclusive were combined and crystallized from acetone-Skellysolve B to give 1.18 grams of 11β-hydroxy-11α-methyl-5β-pregnane-3,20-dione 3-(ethylene acetal) melting point 139–142 degrees centigrade, as in Preparation 5.

*Analysis.*—Calculated for $C_{24}H_{38}O_4$: C, 73.80; H, 9.81. Found: C, 73.43, 73.62; H, 10.36, 10.33.

In like manner, utilizing as the 3,20-diketal intermediate to the 11β-hydroxy-11α-methyl-5β-pregnane-3,20-dione (IIIc) of the present example other 11-alkylated steroids, e.g., where the 11-alkyl groups are those described in Preparation 2 (and made by the process of Preparation 3 employing other alkyl lithiums), there is produced the corresponding 11β-hydroxy-11α-alkyl-5β-pregnane-3,20-dione.

EXAMPLE 2

*11β-hydroxy-11α-butyl-5β-pregnane-3,20-dione (IIIc)*

Two hundred milligrams of 11β-hydroxy-11α-butyl-5β-pregnane-3,20-dione bis (ethylene acetal) (IIa), prepared as described in Preparation 4 above, was dissolved in fifteen milliliters of methanol and treated with one milliliter of 1 N hydrochloric acid for three days, during which time the product began to crystallize. At the end of this period two milliliters of water was added dropwise with stirring to yield additional crystals. The crystals were filtered off and washed with three milliliters of 1:2 aqueous methanol. The product thus recovered weighed 0.10 gram and melted at 166 to 171 degrees centigrade.

EXAMPLE 3

*11β-hydroxy-11α-methyl-5α-pregnane-3,20-dione (IIIc)*

A solution of 8.35 grams of 11β-hydroxy-11α-methyl-5α-pregnane-3,20-dione bis(ethylene acetal) in 150 milliliters of methanol was treated with ten milliliters of 3 N sulfuric acid at room temperature overnight. At the end of this period crystallization had begun, and addition of ten milliliters of water rapidly caused further crystallation. The crystalline product was recovered by filtration, washed with aqueous four percent sodium bicarbonate solution and with water, and dried in vacuo at sixty degrees centigrade to give 6.51 grams of 11β-hydroxy-11α methyl-5α-pregnane-3,20-dione, melting at 208 to 212 degrees centigrade.

EXAMPLE 4

*11β-hydroxy-11α-methyl-5β-pregnane-3,20-dione (IIIc)*

One hundred milligrams of 11β-hydroxy-11α-methyl-5β-pregnane-3,20-dione 3-ethylene acetal (IIIa) was treated with five milliliters of 0.1 N sulfuric acid in five milliliters of methanol to yield 85 milligrams of the hydrolysis product, 11β-hydroxy-11α-methyl-5β-pregnane-3,20-dione (IIIc), melting at 167 to 168 degrees centigrade.

Substituting the 5α-isomer of the starting material above in the hydrolysis reaction is productive of the corresponding 11β-hydroxy-11α-methyl-5α-pregnane-3,20-dione (IIIc).

EXAMPLE 5

*11β,20-dihydroxy-11α-methyl-5β-pregnane-3-one (IIId)*

A mixture of 500 milligrams of 11β-hydroxy-11α-methyl-5β-pregnane-3,20-dione 3-(ethylene acetal) (IIIa), ten milliliters of methanol, and 122 milligrams of sodium borohydride was stirred at room temperature overnight. The ketal was then hydrolyzed by the addition of two milliliters of 3 N sulfuric acid in five milliliters of methanol, stirring being continued for four hours. Dilution with water followed by extraction with methylene chloride gave an oil, which was chromatographed over Florisil. Elution with ten percent acetone-Skellysolve B gave 11β,20 - dihydroxy - 11α - methyl - 5β - pregnane - 3-one (IIId), which was identified by conversion of an aliquot portion to the corresponding 20-acetate by acetylation with eight milliliters of acetic anhydride in eight milliliters of pyridine, the mixture being left at room temperature overnight. Recrystallization from acetone-Skellysolve B yielded the acetate, characterized as follows: melting point, 167 to 169 degrees centigrade; [α]$_D$ plus 42 degrees (acetone); a carbonyl absorption (3-ketone) at 1707 cm.$^{-1}$.

*Analysis.*—Calculated for $C_{24}H_{38}O_4$: C, 73.80; H, 9.81. Found: C, 73.82; H, 9.77.

In exactly the same manner as indicated above, but substituting the 5α isomer of 11β-hydroxy-11α-methyl-5β-pregnane-3,20-dione 3-(ethylene ketal) (IIIa) as the starting material, there is produced 11β,20-dihydroxy-11α-methyl-5α-pregnane-3-one (IIId).

EXAMPLE 6

*3α,11β-dihydroxy-11α-methyl-5β-pregnane-20-one (IIIb)*

The product from Preparation 6, 3α,11β-dihydroxy-11α-methyl-5β-pregnane-20-one ethylene acetal (IIb), was dissolved in 200 milliliters of methanol and treated with ten milliliters of 3 N sulfuric acid at room temperature for 28 hours. Addition of 200 milliliters of water and cooling in a refrigerator overnight produced a gel which, on standing at room temperature, gave 6.74 grams of crystalline solid having a melting point of 149 to 168 degrees centigrade. Repeated recrystallization from acetone-Skellysolve B yielded 0.22 gram of pure 3α,11β-dihydroxy-11α-methyl-5β-pregnane-20-one (IIIb), which melted at 184 to 186 degrees centigrade; [α]$_D$ plus 111 degrees (acetone).

*Analysis.*—Calculated for $C_{22}H_{36}O_3$: C, 75.81; H, 10.41. Found: C, 75.43; H, 10.25.

EXAMPLE 7

*3α,11β-dihydroxy-11α-methyl-5β-pregnane-20-one (IIIb)*

To a solution of 1.9 grams of 11β-hydroxy-11α-methyl-5β-pregnane-3,20-dione (111c) in ten milliliters of cooled dioxane (containing peroxide equivalent to 0.523 gram of hydrogen peroxide per liter) was added a solution of 62 milligrams of sodium borohydride in one milliliter of 0.1 N sodium hydroxide. The mixture was stirred with ice-bath cooling for two minutes, and then twelve milliliters of water was added gradually over a five-minute period. Then 0.65 milliliter of concentrated hydrochloric acid and about 100 milliliters of water were added and the mixture extracted with methylene chloride. The extracts yielded, on evaporation and crystallization of the residue from acetone-Skellysolve B and then from ethyl acetate, 0.93 gram of 3α,11β-dihydroxy-11α-methyl-5β-pregnane-20-one (IIIb) melting at 181 to 183 degrees centigrade.

Following exactly the above procedure but substituting for the starting material the 5α isomer thereof is productive of 3α,11β-dihydroxy-11α-methyl-5α-pregnane-20-one (IIIb).

EXAMPLE 8

*3α,11β-dihydroxy-11α-methyl-5β-pregnane-20-one 3-hemisuccinate*

A mixture of 6.6 grams of 3α,11β-dihydroxy-11α-methyl-5β-pregnane-20-one (IIIb), 6.6 grams of succinic anhydride and sixty milliliters of pyridine was refluxed for 21 hours and then poured over crushed ice. After the ice had melted the product was recovered by filtration and washed with water, 1 N hydrochloric acid, and water; weight: 5.67 grams, melting point 153 to 156 degrees centigrade. A sample was recrystallized several times from aqueous methanol to melting point 156 to 159 degrees centigrade, [α]$_D$ plus 104 degrees (acetone).

*Analysis.*—Calculated for $C_{26}H_{40}O_6$: C, 69.61; H, 8.99; Sap. Eq. 224.3. Found: C, 69.69; H, 8.96; Sap. Eq. 227.2.

The sodium salt was prepared as a buffered preparation by stirring 5.2 grams of the above product and 3.1 grams of trisodium phosphate dodecahydrate in 100 milliliters of water together for thirty minutes, filtering through a Seitz filter, and lyophilizing the filtrate. There was obtained 7.0 grams of fluffy solid.

Other esters are formed by substitution of the appropriate esterifying agent for the succinic anhydride above. The desired ester radicals are, for example, those containing the acyl radicals of the acids formic, propionic, butyric, isobutyric, valeric, isovaleric, trimethylacetic, 2-methylbutyric, 3-ethylbutyric, hexanoic, diethylacetic, triethylacetic, heptanoic, octanoic, optically active abietic, α-ethylisovaleric, cyclopropylideneacetic, cyclopentylformic, cyclopentylacetic, α and β-cyclopentylpropionic, cyclohexylformic, cyclohexylacetic, α and β-cyclohexylpropionic, benzoic, 2, 3 or 4-methylbenzoic, 2,3-, 2,4-, 2,5-, 2,6,-, 3,4-, and 3,5-dimethylbenzoic, ethylbenzoic, 2,4,6-trimethylbenzoic, 2,4,6-triethylbenzoic, α-naphthoic, 3-methyl-α-naphthoic, phenylacetic, α and β-phenylpropionic, diphenylacetic, triphenylacetic, succinic, glutaric, α-methylglutaric, β-methylglutaric, β,β-dimethylglutaric, adipic, pimelic, suberic, glycolic, lactic, citric, tartaric, d-malic, d-glyceric, malonic, gluconic, salicylic, glycine, diglycollamic, triglycollamic, methylglycine, dimethylglycine, diethylglycine, para-aminosalicylic, para-aminobenzoic, ethylmercaptoacetic, benzylmercaptoacetic, cyanoacetic, chloroacetic, fluoroacetic, trichloroacetic, trifluoroacetic, thioglycolic, 3,4,5-trimethoxybenzoic, α-naphthoxyacetic, β-pyrrolidylpropionic, carbamic acid, phenylcarbamic, n-butylcarbamic, dimethylcarbamic, diethylcarbamic, allophanic, α and β-furylcarboxylic, N-methyl-pyrrolidyl - 2 - carboxylic, α-picolinic, indole-2-carboxylic, 6-hydroxyindolyl-3-acetic, N-methylmorpholyl-2-carboxylic, pyrrolyl-2-carboxylic, etc.

Following exactly the above procedure but substituting for the starting material the 5α isomer thereof is productive of the corresponding 3-esters of 3α,11β-dihydroxy-11α-methyl-5α-pregnane-20-one.

EXAMPLE 9

*3α,11β,20-trihydroxy-11α-methyl-5β-pregnane (IV)*

A mixture of 500 milligrams of 11β-hydroxy-11α-methyl-5β-pregnane-3,20-dione (IIIc), ten milliliters of methanol and 25 milligrams of sodium borohydride is stirred continuously for sixteen hours at room temperature. At the end of this period 150 milliliters of hot water is added to the reaction mixture. Cooling the mixture to room temperature yields a crystalline product which, on extraction with ether and recrystallization from acetone-water, gives essentially pure 3α,11β,20-trihydroxy-11α-methyl-5β-pregnane (IV).

Repeating the above procedure but substituting 11β, 20-dihydroxy-11α-methyl-5β-pregnane-3-one (IIId) or 3α, 11β-dihydroxy-11α-methyl-5β-pregnane-20-one (IIIb) as the starting material and adding 125 milligrams of sodium borohydride instead of the 150 milligrams used therein as the reducing agent, there is produced 3α,11β,20-trihydroxy-11α-methyl-5β-pregnane (IV) in substantially pure form.

In the same manner, 11β-hydroxy-11α-alkyl-5β-pregnanes having other lower alkyl substituents at the 11α position, i.e., those indicated in Preparation 2 above, are converted to the corresponding 3α,11β,20-trihydroxy-11α-alkyl-5β-pregnanes (IV).

EXAMPLE 10

*3β,11β,20-trihydroxy-11α-methyl-5α-pregnane (IV)*

Following the procedure of Example 9 but substituting for the appropriate starting materials therein the corresponding 5α isomers, i.e., 11β-hydroxy-11α-methyl-5α-pregnane-3,20-dione (IIIc) and 11β,20-dihydroxy-11α-methyl 5α-pregnane-3-one (IIId), there is produced 3β, 11β,20-trihydroxy-11α-methyl-5α-pregnane (IV) in substantially pure form.

Similarly, starting steroids having other lower alkyl groups at the 11α position, i.e., those indicated in Preparation 2 above, are converted to the corresponding 3β, 11β,20-trihydroxy-11α-alkyl-5α-pregnanes (IV).

It is to be understood that the invention is not to be limited to the exact details of operation or exact compounds shown and described, as obvious modifications and equivalents will be apparent to one skilled in the art; the invention is therefore to be limited only by the scope of the appended claims.

I claim:

1. 11α-alkylated steroids represented by the following formula:

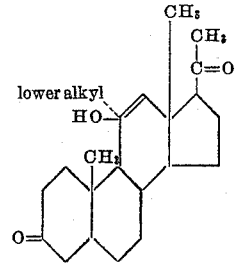

2. 11β-hydroxy-11α-methyl-5β-pregnane-3,20-dione.

References Cited in the file of this patent

UNITED STATES PATENTS

| | | |
|---|---|---|
| 2,255,264 | Marker | Sept. 9, 1941 |
| 2,647,134 | Hogg | July 28, 1953 |
| 2,683,724 | Hogg et al. | July 13, 1954 |
| 2,728,782 | Magerlein et al. | Dec. 27, 1955 |
| 2,752,369 | Holysz | June 26, 1956 |
| 2,773,888 | Oliveto et al. | Dec. 11, 1956 |
| 2,824,871 | Levin et al. | Feb. 25, 1958 |

OTHER REFERENCES

"Elsevier's Encyclopaedia of Organic Chemistry," Series III, vol. 14, Supplement (Amsterdam: Elsevier Pub. Co., 1956), page 2108s.